Patented June 27, 1939

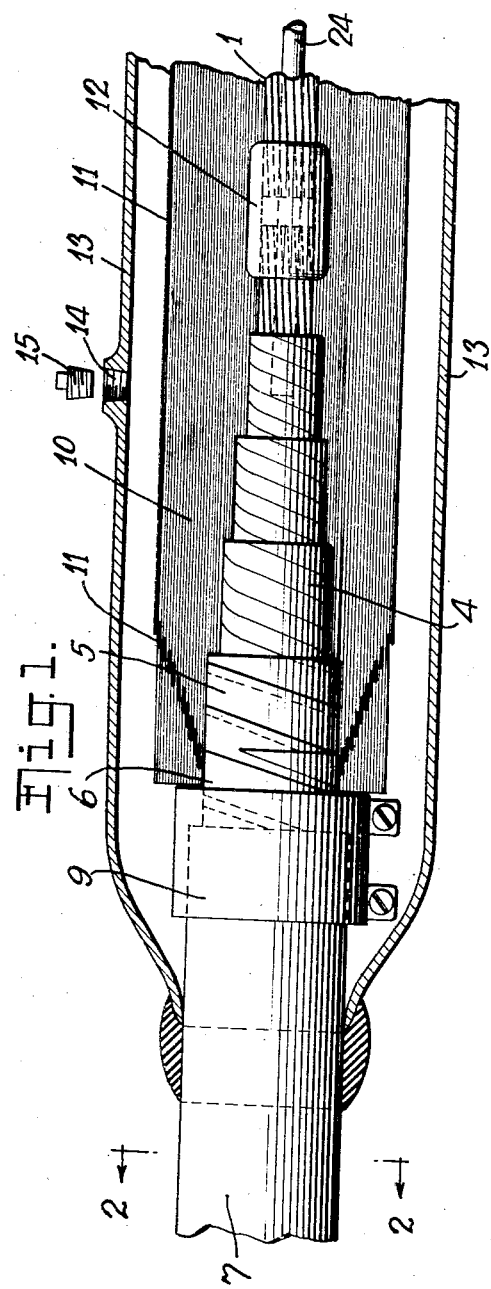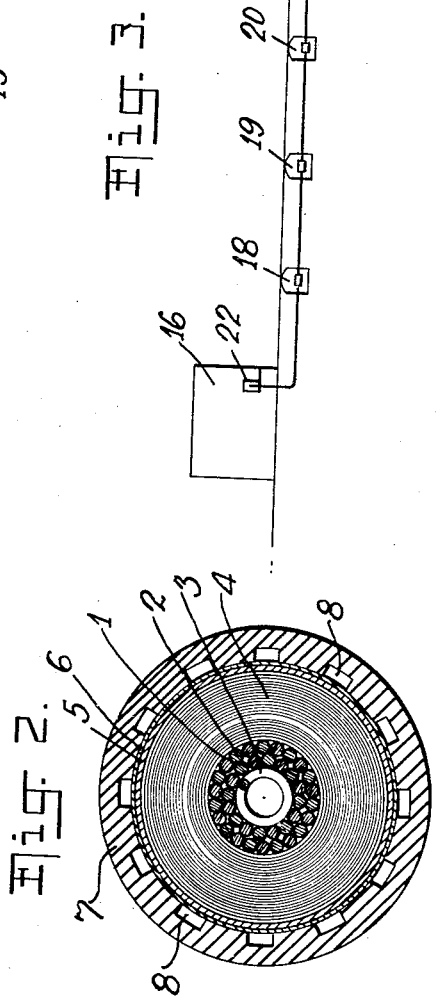
Fig. 1. Fig. 2. Fig. 3.
Inventor
HENRY W FISHER
By Attorneys

2,163,783

UNITED STATES PATENT OFFICE 2,163,783

CABLE INSTALLATION

Henry W. Fisher, Perth Amboy, N. J., assignor to General Cable Corporation, New York, N. Y., a corporation of New Jersey Application January 4, 1929, Serial No. 330,239

2 Claims. (Cl. 174—15)

This invention relates generally to the construction and installation of liquid insulated cables and more particularly to the attachment of joint and terminal structures thereto.

A liquid insulated cable is one whose conductor, spaced (usually by a body of pervious laminate material) from an impervious surrounding envelope, is immediately enveloped in liquid insulation. Ordinarily the conductor is arranged within and in spaced relation to the surrounding envelope, by being immediately surrounded by a fibrous body, and the liquid insulation penetrates and fills the fibrous body. The fibrous body is usually of laminated character, built of paper tape, and the liquid insulation is usually an oil which at normal operating temperatures is fluid. Herein the term oil-filled cable will be used to designate cables whose conductor is spaced from the sheath and the space filled or flushed with liquid insulating material.

One of the difficulties which hitherto has attended the use of oil-filled cables has been that of attaching terminals and uniting the cable, length to length, as it comes from the factory, without detrimental loss of oil and ingress of air or moisture into the cable insulation. In view of the substantially similar problems attending the attachment of terminals and the formation of joints, particular reference to terminal structures will not be unnecessarily repeated herein.

The lengths of cable as they come from the factory are sealed at the ends, and the operation of jointing includes opening the ends, cutting back sheath and insulation to expose the conductor ends, uniting the so exposed ends of the conductors, and building around the union a body of insulation within a casing which at its ends is united hermetically to the cable sheath on either side of the joint.

The invention will be described in connection with the accompanying drawing wherein Figure 1 is a longitudinal section of a cable joint;

Figure 2 is a cross section of line 2—2 of Figure 1; and

Figure 3 is a diagrammatic representation of a cable system which will be hereinafter referred to.

The cable shown for purposes of illustration in the accompanying drawing is of the type described in Letters Patent No. 1,574,076 dated February 23, 1926. This cable comprises a hollow conductor 1 consisting of a number of strands of copper wire 2 assembled about a hollow core formed of a spiral steel wire 3. The conductor is surrounded by a body of pervious laminate insulation 4 made up of a number of layers of paper of a proper grade and quality. Cables are usually made in lengths approximating the distance between adjacent joint structures in the system in which they are to be installed and, for purposes later to be described, a portion of the paper insulation for a distance of five or six feet from the end of the cable is covered with one or more layers of a relatively impervious material such as varnished cambric. This layer is indicated in the drawing by reference numeral 5. The cable herein shown also preferably embodies the invention of Hochstadter Letters Patent No. 1,199,789, dated October 3, 1916, in that it has a tape 6 of metal foil wrapped over the completed insulation from end to end of the cable. The copper conductor thus insulated is surrounded by an impervious metal sheath 7 which as it is formed and applied to the cable is provided with interiorly located channels 8.

The herein described cable illustrates a construction in which fluid oil insulation may be advantageously used, and it will be observed that through the hollow core and the channels 8, oil may be supplied to the pervious insulation both externally and internally. Such cable may be thoroughly impregnated and filled with an oil which is fluid at ordinary temperatures and thus shipped from the factory to the point where it is to be installed.

Fig. 1 of the drawing shows a completed joint structure. It will be observed that the lead sheath has been cut back for a suitable distance. In order to close the oil ducts 8 in the lead sheath, a stuffing box or clamp 9 may be provided to fit over the end of the lead sheath and also to fit tightly over the interior structure of the cable immediately adjacent thereto. The insulation has been removed in graduated steps from the conductor 1 back along the cable toward the end of the lead sheath 7 and a body of wrapped-on paper insulation 10 applied. This paper insulation may be provided with stress distributing elements 11, in accordance with Letters Patent No. 1,642,515 dated September 13, 1927. A connector 12 serves to connect the conductor 1 of one length of cable with the corresponding conductor of the adjacent length of cable. A sleeve 13 having a soldered or other oil-tight union with the lead sheath 7 and with the corresponding sheath of the adjacent length of cable is provided to surround the entire joint. The sleeve 13 is provided with threaded opening 14 which may be closed by a plug 15 or may be used to connect the joint with a supply of oil under pressure.

Fig. 3 will be referred to in describing the installation of a cable in accordance with present invention. Therein a power house and sub-station are diagrammatically represented at 16 and 17 respectively and lengths of cable, jointed in the manholes 18, 19, 20 and 21, serve to connect the electrical apparatus of the power house with that of the sub-station. After the several lengths of cable have been drawn into place, they may be connected to their respective terminal structures and to each other at the several joints in the following manner without detrimental loss of oil and without permitting the ingress of air or moisture.

Each cable length of the type herein referred to is usually provided at the factory with a tap tube adjacent each end. At the outset the tube at the end of the first length of cable in the first manhole numbered 18 in Fig. 3 would be connected with a supply of oil under sufficient pressure to raise the body of oil within the length to a level slightly above the terminal structure 22. Under such conditions the end of the cable near the terminal structure 22 may be opened and the lead sheath removed for a sufficient distance along the length of the cable to permit of the attachment of the terminal structure. While this is being done oil will flow from the channels 8 and from the open end of the hollow core within the conductor. The rate of flow should be adjusted so that a sufficient amount of oil will be available to keep the exposed end of the cable insulation protected by a substantial film or curtain of oil. Then the bushing 9 may be applied to stop the flow of oil from the channels 8. The flow of oil radially from the exposed surface of the insulation will be retarded by the relatively impervious varnished cambric wrapping 5, while the foregoing and other operations are being carried forward. The flow of oil through the hollow core may also be retarded by a temporary plug.

The cable insulation may now be cut back to a distance sufficient to permit the attachment of a connector to the conductor and to permit the performance of such other operations as may be necessary to assemble a proper terminal structure with the end of the cable. The terminal structure should have provision for connection with a supply of oil under pressure for purposes about to be described.

The first length of cable having thus been connected with the terminal structure indicated at 22 and such terminal structure in turn having been connected with a supply of oil under pressure, attention may be given to the jointing of adjacent cable lengths within the manhole 18. The procedure initially will be similar to that just described with respect to the attachment of the terminal structure. The end of the second length of cable in the manhole 19 may be connected with a supply of oil under pressure or a surplus of oil may be supplied to the second length of cable from the first length, as hereinafter described. Operations upon adjacent ends of the first and second lengths of cable within the manhole 18 may be carried on simultaneously or consecutively, up to the point of constructing the joint insulation, and therefore reference will be made only to such operations upon the first length of cable. If desired, the cable ends may be brought to vertical position.

Having properly adjusted the pressure and supply of oil through the terminal structure 22, the end of the first length of cable may be opened and the lead sheath removed for the necessary distance as indicated in Fig. 1. The bushing 9 may now be attached, to stop the flow of oil through the channels 8, while the varnished cambric wrap 5 minimizes the flow of oil radially from the exposed insulation. A temporary stop may be inserted in the hollow core of the conductor 1.

The metallic foil 6 may now be removed back to a point adjacent the bushing 9 and the varnished cambric 5 and underlying paper insulation 4 removed in successive steps as is usual in the making of joints. As the insulation is removed, oil will flow radially from the surface of the underlying layers of paper, and thus the ingress of air or moisture will be effectively prevented. The loss of oil will not be excessive because of the character of the paper used in the insulation of such cables.

The adjacent cable end may be prepared in similar manner while oil is being supplied from a suitable source located in manhole 19 or, under proper conditions, it may be possible to supply oil to the second section of cable from the first section by inserting a tube 24 connecting the hollow cores of the first and second sections of cable.

The two cable ends having thus been prepared, the insulating of the joint may be carried forward in any appropriate manner, depending upon the type of joint insulation to be used. The accompanying drawings show the joint insulated with wrapped insulation, and the operation of applying the roll of paper constituting this joint may be carried forward while the oil supply from the terminal structure 22 or at the manhole 19, or both, is flowing slowly through the joint and preventing the ingress of any air or moisture. When the wrapping on of the joint insulation has been completed the bushing 9 on the first length of cable and corresponding bushing on the second length may be removed (or they may be left in place, according as it is desired), to place the adjacent lengths of cable in more or less free oil communication with each other. The sleeve 13 may now be brought into place and its ends united to the cable sheath 7 of adjacent sections by soldering or in any other appropriate manner. As the sleeve 13 is brought into place it will gradually fill with oil and any contained air will be forced out through the tap hole 14. This hole may be closed by the screw plug 15 or an oil reservoir may, through this hole 14, be connected with the joint.

The construction of other joints may then be carried out in the manner above described, and finally the cable end in the sub-station 17 may be attached to its terminal structure 23 in similar manner, the necessary oil, during such operation, being supplied from a reservoir connected with the cable joint in the manhole 21 or, if convenient or desirable, from the far end of the cable in the power house 16.

It will be observed from the foregoing description that the procedure herein described is such that all the necessary operations upon the ends of the cable lengths may be conducted under such conditions as to prevent loss of oil from the cable; such oil as escapes being immediately replaced by oil of the same character. In this manner the formation of voids or the entrance of air, moisture or other deleterious substance is effectively prevented, and cable may thus be installed and put into service in a condition comparable to that in which it has been subjected to factory tests, and with every assurance that the integrity of the insulation throughout each length of cable has been preserved.

The foregoing description has been directed to those skilled in the art of cable making and installation, and it will be understood that the invention may be variously modified and carried out within the scope of the subjoined claims.

I claim as my invention:

1. The improvement in the art of installing oil-filled lengths of cable having an oil duct within the conductor and a plurality of oil ducts between the cable insulation and sheath, which consists in connecting one end of a length of cable to a supply of oil under pressure, opening the other end and removing a portion of the lead sheath therefrom, applying a closure to the oil ducts located between the cable insulation and sheath, progressively removing the insulation and applying a joint or terminal structure while maintaining a constant flow of oil from the open end of the cable until completion of said joint or terminal structure.

2. The improvement in the art of affixing joint and terminal structures to oil-filled cable having a conductor, insulation, sheath, an oil duct within the conductor and an oil duct between the insulation and the sheath, which comprises connecting one end of a length of the cable to a supply of oil under pressure, opening the other end of the cable and removing a portion of the sheath therefrom, applying a closure to the oil duct located between the insulation and the sheath at the end of the sheath, plugging the oil duct within the conductor at the end thereof, and applying a joint or terminal structure to the opened cable end while maintaining a continuous flow of oil radially outwardly through the cable insulation exposed between the said closure and the plugged end of the conductor to maintain a film of oil on the insulation surface preventing ingress of air and moisture.

HENRY W. FISHER.